United States Patent [19]

Viaud

[11] Patent Number: 5,557,906

[45] Date of Patent: Sep. 24, 1996

[54] PIVOTABLE GUIDE PAN FOR ROUND BALE WRAPPING MATERIAL

[75] Inventor: Jean Viaud, Sarreguemines, France

[73] Assignee: Deere & Company, Moline, Ill.

[21] Appl. No.: 504,206

[22] Filed: Jul. 19, 1995

[30] Foreign Application Priority Data

Jul. 22, 1994 [DE] Germany ............... 44 26 034.2

[51] Int. Cl.⁶ ............................................. B65B 27/12
[52] U.S. Cl. .................................. 53/118; 53/587
[58] Field of Search .................... 53/118, 587, 211, 53/389.3, 556

[56] References Cited

U.S. PATENT DOCUMENTS

| | | | |
|---|---|---|---|
| 4,697,401 | 10/1987 | Anstey et al. | 53/118 X |
| 4,956,968 | 9/1990 | Underhill | 53/118 X |
| 5,433,059 | 7/1995 | Kluver et al. | 53/118 X |
| 5,450,704 | 9/1995 | Clostermeyer | 53/118 |

FOREIGN PATENT DOCUMENTS

| | | |
|---|---|---|
| C23418681 | 1/1990 | Germany . |
| U9211541 | 12/1992 | Germany . |

Primary Examiner—Linda Johnson

[57] ABSTRACT

A round baler is provided with a bale wrapping mechanism including a wrap material guide assembly comprising a guide pan having an operative position wherein a guide surface is disposed upwardly for guiding wrap material into the baling chamber by way of a gap existing between adjacent fixed rolls forming at least a portion of the baling chamber. The guide pan is mounted for pivoting vertically and shifting fore-and-aft for permitting it to move to a inoperative position wherein a majority of the guide surface is disposed near vertical with the remainder being steeply disposed so that crop material and dirt will not accumulate on the guide surface. A wrap material cutting device includes a knife assembly including a knife mounted between opposite arms and being pivotal between a stand-by position, wherein the knife is disposed below a feed path of the wrap material when the latter is passing through the gap into the bale chamber during wrapping of a bale, and a cutting position wherein it traverses the feed path. At least one coil extension spring is coupled between the knife assembly and the guide pan for causing the latter to be moved to its inoperative position whenever the knife is moved to its operative position and to be moved to its operative position whenever the knife is moved to its stand-by position.

5 Claims, 2 Drawing Sheets

5,557,906

PIVOTABLE GUIDE PAN FOR ROUND BALE WRAPPING MATERIAL

BACKGROUND OF THE INVENTION

The present invention relates to round balers with an arrangement for wrapping a bale with an envelope of wrapping material such as plastic film or net, and more specifically relates to a guide for directing such material into the baling chamber.

DE-C2-34-18-681 discloses a round baler with an arrangement for wrapping a bale formed in a baling chamber with plastic film or net. The enveloping material is guided in each case over an inclined sheet metal chute to the baling chamber.

This round baler has the disadvantage that crop residues can accumulate on the inclined chute and prevent the sliding of the enveloping material on the chute thus leading to problems at the beginning of the wrapping process.

U.S. Pat. No. 4,956,968 discloses a net wrapping arrangement wherein the net is introduced over a guide arrangement composed of two sheet metal chutes located one above the other into a slot between two wrapping rolls in a baling chamber. The guide arrangement can be brought from a position close to the baling chamber to a remove location and the envelope is protected from dirt by the upper sheet metal chute; however, the danger remains that dirt can accumulate on the upper chute that could impair the entry of both chutes into the slot between the two wrapping rolls, and the overall cost of manufacture is high.

In DE-U-92 11 541 there is disclosed a round baler having a bale wrapping arrangement also including a movable net wrap material guide chute. The drive for causing movement of the net produces vibrations in the chute so that the net does not hang up, for example, due to static electricity; nevertheless in the stationary phase of the chute broken crop could build up and impair the travel of the net. In addition, the vibratory drive is very costly.

SUMMARY OF THE INVENTION

According to the present invention there is provided a bale wrapping arrangement for wrapping bales made in the bale-forming chamber of a large round baler and more specifically there is provided an improved guide chute device for the wrapping arrangement.

An object of the invention is to provide a wrapping arrangement guide chute device constructed so as to minimize the accumulation of dirt that can impede the progress of wrapping material, such as plastic sheet or net, along the guide chute.

A more specific object of the invention is to provide a guide chute device having a guide chute mounted for being pivoted between a non-use position, wherein the guide surface is disposed so as not to collect dirt, and an operating position for guiding wrap material to the bale-forming chamber.

DESCRIPTION OF THE PREFERRED EMBODIMENT

Figure 1:
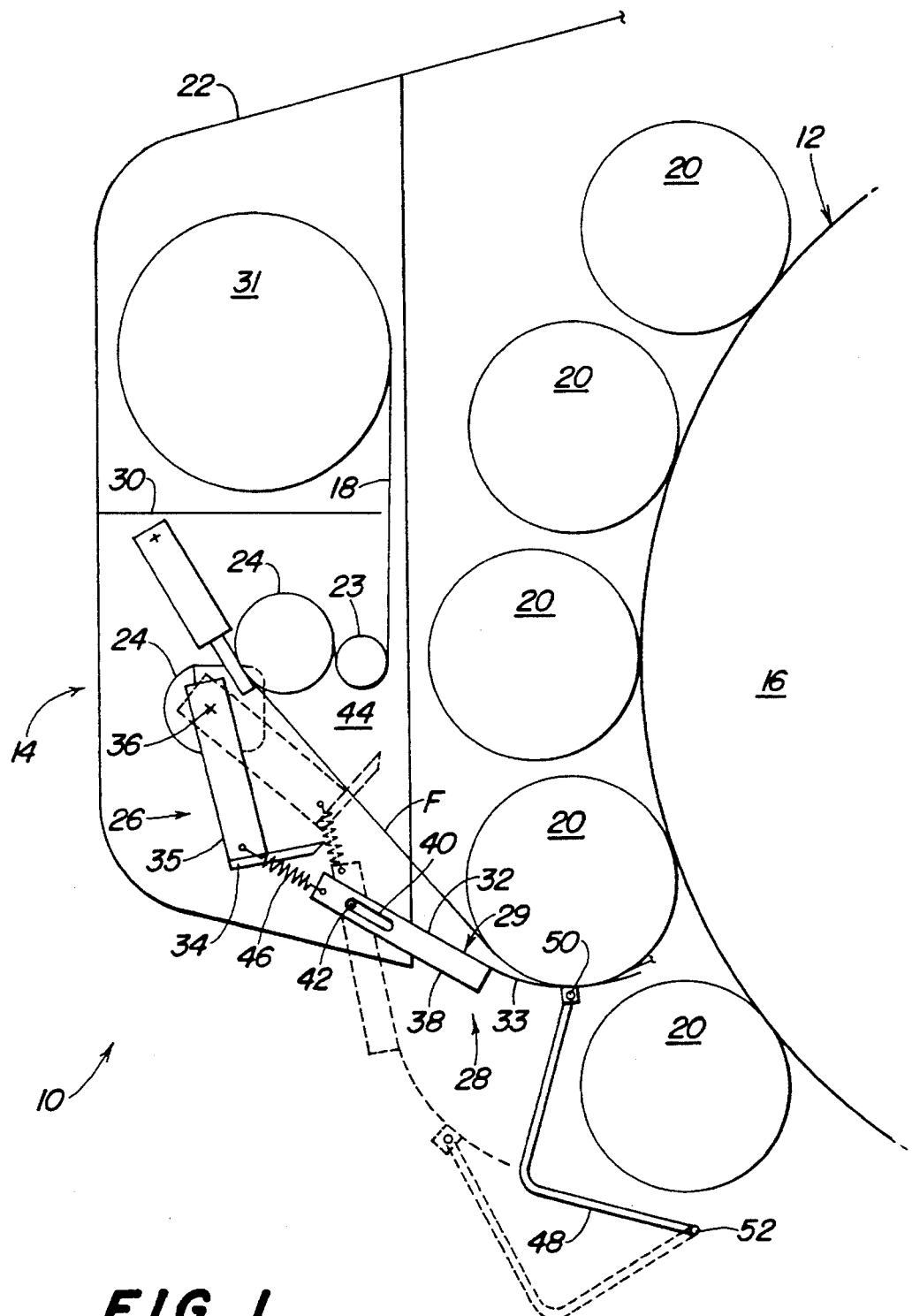
FIG. 1 is a right side view of the rear portion of a large round baler showing a bale wrapping arrangement embodying a wrap material guide assembly constructed in accordance with the principles of the present invention.

Referring now to FIG. 1, there is partially shown a baler 10 for forming large round bales of crop material, such as straw, hay, and grass, and also for forming large round bales of industrial materials such as plastic film, rags or wood scraps. The baler 10 includes a baling chamber 12 and a wrapping arrangement 14 for enveloping a bale 16 being formed in the baling chamber with wrap material 18. The baler 10 may be of any known design, that is, with the baling chamber 12 being of fixed or variable :size, having its perimeter defined exclusively by rolls 20, as shown, or by belts or chains, or by a combination of two or more of rolls, belts or chains.

In the illustrated embodiment, the wrapping arrangement 14 is mounted to the rear of the baler 10 at approximately half the height of the baling chamber 12 in order to conduct the wrap material 18, through a slot between two adjacent rolls 20, to the baling chamber 12 where it is carried along by the rotating bale 16. However, the arrangement 14 may also be positioned at another location of the baler 10, for example, ahead of or above the baling chamber 12. The wrap material 18 may be a web of any type of material able to bind the bale 16 so as to protect the latter from falling apart after leaving the baler 10, such as plastic sheet or netting, fabric, paper or the like.

The wrapping arrangement 14 includes known components such as a housing 22, a guide roll 23, a pair of feed rolls 24, a cutter arrangement 26 and a wrap material guide assembly 28, including a guide pan 29. The housing 22 contains a wrap material storage compartment 30 in which is found a roll 31 of the wrap material 18. A length of the; material 18 extends off a front side of the roll 31 and downwardly through a slot provided at a lower front corner of the compartment 30. This length of material is looped under the guide roll 23 and over the front feed roll 24 and through a nip defined by the pair of feed rolls 24. From the feed rolls 24, the length of wrap material extends along a feed path F, located above a planar rear section 32 of the guide pan 29, to a nip defined between an upper one of the two rolls 20, forming the gap through which the wrap material 18 enters the chamber 12, and a curved forward section 33 of the guide pan 29 extending arcuately about and in close proximity to the lower periphery of such upper roll 20. The cutter arrangement 26 includes a knife 34 that extends between and is fixed to a pair of parallel arms 35 (only one shown) that are mounted for pivoting about respective bearings, located at 36, in order to traverse the feed path F of the wrap material 18 when it is desired to separate wrap material enveloping the bale 16 from that forming the roll 31. The cutter arrangement 26 is operated in a known manner by a control or regulating arrangement. In these known arrangements, the knife 34 is located in the feed path F of the wrap material 18 except during the wrapping process. According to the illustration of FIG. 1, the cutter arrangement 26 can be pivoted between a non-operating or stand-by position (solid lines) and an operating or cutting position (dashed lines).

Returning to the description of the wrap material guide assembly 28, it can be seen that the planar section 3? of the guide pan 29 extends between a location adjacent the cutter arrangement 26 to its other end joined to the rear end of the arcuate section 33 so that the material 18 is confined and effectively guided unimpeded to the baling chamber 12. In the embodiment of the guide pan 29 shown in FIG. 1, the planar section 32 is formed of a plate defining a planar guide surface with edges 38 of the plate being bent downward. In a region of each of the edges 38, which is closer to the cutter arrangement 26 than to the arcuate section 33, there is provided an elongated hole 40, the holes 40 being received on respective pins 42 projecting from opposite side walls 44 of the housing 22 so as to establish an axis about which the guide pan 29 may pivot vertically. A helical extension spring 46 is provided between at least one of the knife support arms 35 and the end of the guide pan planar section 32 closest to the cutter arrangement 26, the spring 46 establishing a link between the cutter arrangement 26 and the guide pan 29 which causes the latter to be pivoted between an inoperative position, shown in dashed lines, and an operative position, shown in solid lines, respectively as the cutter blade 34 and arms 35 are pivoted between operative and stand-by positions. At least one L-shaped support link 48 has its upper end pivotally connected, as at 50, to a tab joined to the under side of the curved guide pan section 33, and has its lower end pivotally connected, as at 52, to a location beneath the lower of the two bale chamber rolls 20 forming the gap through which the wrap material 18 is fed. It is here noted that the elongated holes 40, pin 42 and support link 48 cooperate to cause the guide pan curved section 33 to move into and out of the gap between the rolls 20 without interfering with the latter.

As shown in FIG. 1, the guide assembly 28 is in its operating position wherein the guide pan 29 conducts the wrap material 18 to the baling chamber 12 while the cutter arrangement 26 is in its standby position. However, as soon as the cutter arrangement 26 is swung counterclockwise about its connection 36 to its operating position, the wrap material located along the path F will be severed. Thus, the guidance of the pan 29 is now no longer required, and, in fact, the pan 29 will be pivoted in a clockwise direction about the pins 42 as a result of the spring 46 pulling upwardly on the rear of the pan 29 as the arms 35 swing upwardly or counterclockwise about the connection 36. At the same time the lower end of the guide pan 29 will be caused to move downwardly and rearwardly by the support link 48. The guide, assembly 28 is then in its non-operating position shown in FIG. 1 wherein the guide surface of the guide pan straight section 32 occupies a near vertical position and the guide pan arcuate section 33 is steeply disposed, so that small particles of crop that escape from the baling chamber 12 through the gaps between the rolls 20 cannot accumulate on the guide sections 32 and 33 but instead can escape downwardly to the ground. The guide assembly 28 remains in this position until the cutter arrangement 26 is again returned to its non-operating position, which occurs only when the next bale 16 that has been formed is to be wrapped. Accordingly, no dirt or crop material can accumulate on the wrap material directing surface of the guide pan 29 during the building phase of the bale 16 and therefore no obstacle is present which would hinder the feeding of the material 18 to the baling chamber 12 upon pivoting of the guide pan 29, in the counterclockwise direction about the pins 42, back to its operating position shown in solid lines in FIG. 1.

Figure 2:
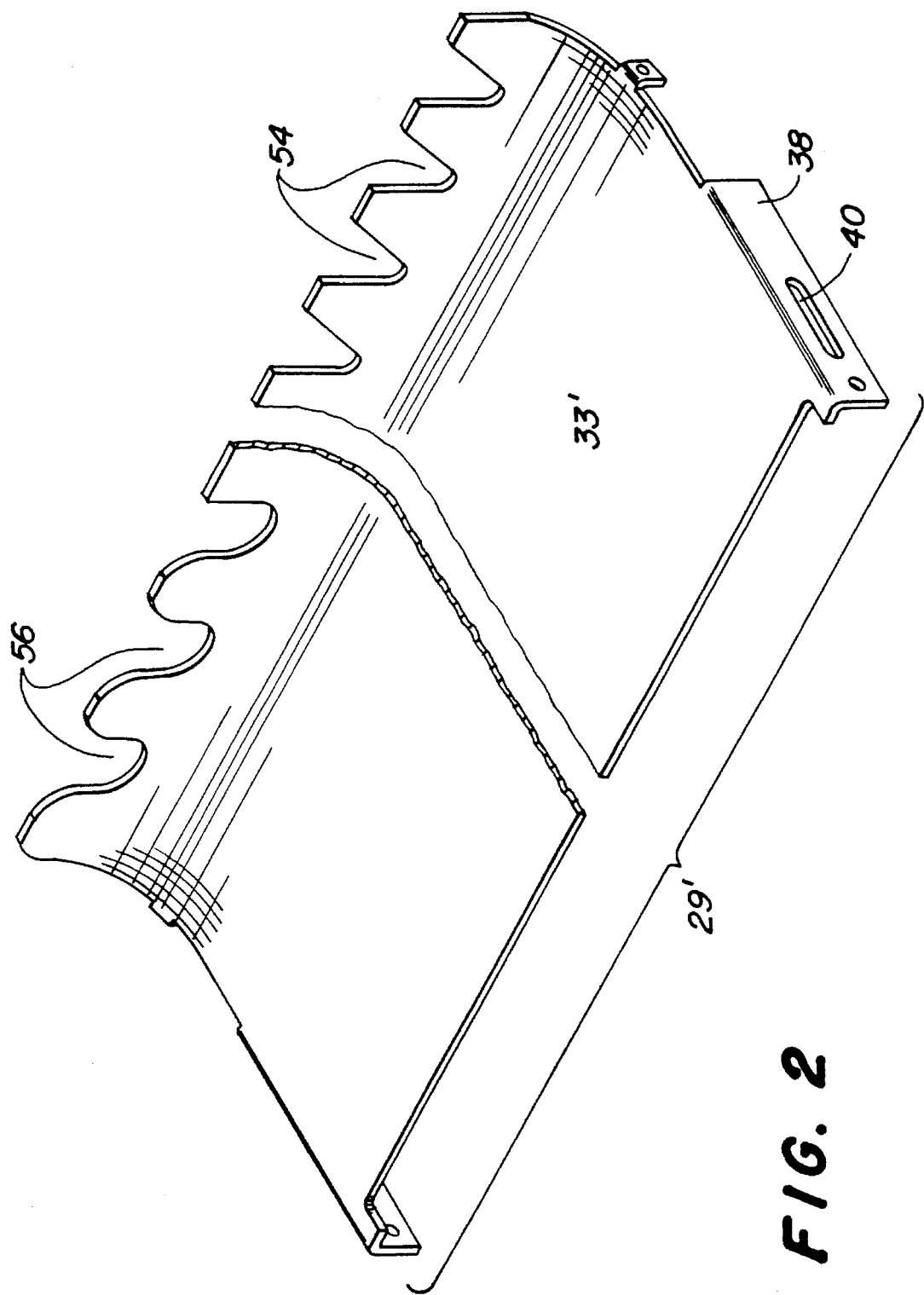
FIG. 2 is a perspective view of the wrap material guide pan showing one type of relief notches in the right-hand portion of the pan and showing another type of relief notches in the left-hand portion of the pan.

It is noted that the forward end of the curved section 33 of the guide pan 29 shown in FIG. 1 is straight or linear and that a guide pan constructed in this manner will normally not collect crop material or dirt when the pan is positioned in its non-operating position. However, the chances of crop material or dirt collecting on the guide pan can be further diminished by providing a guide pan constructed as shown in FIG. 2. Specifically, therein is shown a guide pan 29' having features in common with the aforedescribed guide pan 29, with the same reference numerals being used to denote these common features. The difference between the pans 29 and 29' is that the front of the pan curved section is here provided with a series of either V-shaped (right-hand side) or U-shaped (left-hand side) notches 54 and 56, respectively, through which crop material or dirt can escape. However, in place of these guide pan end configurations, other configurations such as a rake, a grate, a screen, or the like could be used so long as the configuration provides openings, recesses, incisions or the like through which crop material or dirt can pass.

I claim:

1. In a round baler having a baling chamber for forming large cylindrical bales and including a gap serving as a wrap material inlet, a wrapping mechanism mounted exteriorly of said chamber adjacent said gap and including a wrap material feed mechanism, a wrap material guide assembly, and a wrap material cutting mechanism, said feed mechanism including a pair of feed rolls for feeding wrap material along a feed path extending towards said gap, and said guide assembly including a guide pan disposed in an upwardly facing orientation below said feed path for intercepting wrapping material discharged from the feed rolls and directing it towards said gap, and said cutting mechanism including a cutting knife secured to support arm means mounted for movement between a stand-by position disposing said cutting knife away from said feed path and a cutting position diposing said cutting knife across said feed path, the improvement comprising: mounting means supporting said guide pan for movement between an operative position diposing said guide surface in said upwardly facing orientation and an inoperative position wherein said guide surface is nearly vertical; and a spring means coupled between said guide pan and said support arm means for moving said guide pan to said inoperative position in response to said cutting blade being moved to said cutting position, and for moving said guide pan to said operative position in response to said cutting blade being moved to said stand-by position.

2. The round blader defined in claim 1 wherein said mounting means includes a pair of transversely spaced axially aligned pins; and said guide pan having a pair of transversely spaced flanges provided with holes respectively receiving said pair of pins, whereby said guide pan pivots about said pins to and from its operative and inoperative positions.

3. The round baler defined in claim 2 wherein said bailing chamber is defined at least in part by a plurality of fixed rolls located one above the other along arc; said gap being located between an adjacent pair of said fixed rolls; said guide pan including a curved section located in said gap and in close proximity to a lower portion of an upper one of said adjacent pair of said fixed rolls when said guide pan is in said operative position; said holes of said guide pan flange being elongated; and said mounting means further including a support link having opposite ends pivotally connected to an underside of said curved section and frame location so as to cooperate with said pair of pins and elongated holes to cause said guide pan to move between its operative and inoperative positions without the curved section thereof interfering with said of said rolls as it moves to and from gap.

4. The round baler defined in claim 1 wherein said spring means is a coil tension spring.

5. The round baler defined in claim 3 wherein said curved section includes an end defined by a plurality of notches formed along a transverse edge thereof.

\* \* \* \* \*

UNITED STATES PATENT AND TRADEMARK OFFICE
CERTIFICATE OF CORRECTION

PATENT NO. : 5,557,906
DATED : 24 September 1996
INVENTOR(S) : Jean Viaud

It is certified that error appears in the above-indentified patent and that said Letters Patent is hereby corrected as shown below:

Column 4, line 25 insert -- a -- after "to"

Column 4, lines 28 & 31 delete "diposing" and insert "disposing"

Column 4, line 47 insert -- an -- after "along"

Column 4, line 58 insert -- pair -- after "said" (first occurance)

Column 4, line 58 insert -- said -- after "from".

Signed and Sealed this

Nineteenth Day of August, 1997

*Attest:*

BRUCE LEHMAN

*Attesting Officer*      Commissioner of Patents and Trademarks